United States Patent
Ren et al.

(10) Patent No.: US 9,854,206 B1
(45) Date of Patent: Dec. 26, 2017

(54) PRIVACY-AWARE INDOOR DRONE EXPLORATION AND COMMUNICATION FRAMEWORK

(71) Applicant: TCL RESEARCH AMERICA INC., San Jose, CA (US)

(72) Inventors: Xiaobo Ren, San Jose, CA (US); Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 0 days.

(21) Appl. No.: 15/388,755

(22) Filed: Dec. 22, 2016

(51) Int. Cl.
*H04N 7/14* (2006.01)
*H04N 7/15* (2006.01)
*B64C 39/02* (2006.01)

(52) U.S. Cl.
CPC .......... *H04N 7/147* (2013.01); *B64C 39/024* (2013.01); *H04N 7/15* (2013.01); *B64C 2201/12* (2013.01)

(58) Field of Classification Search
CPC .............. G06K 9/00228; H04N 7/185; H04N 21/41407; H04N 21/4223; H04N 5/23248; H04N 5/23254; H04N 5/2621; H04N 5/272; H04N 7/141; H04N 7/147
USPC ................................ 348/14.01, 14.02, 14.08
See application file for complete search history.

(56) References Cited

U.S. PATENT DOCUMENTS

| | | | |
|---|---|---|---|
| 6,914,622 B1* | 7/2005 | Smith ................ | A47B 21/0073 348/14.05 |
| 2012/0081500 A1* | 4/2012 | Border ............... | G06K 9/00228 348/14.02 |
| 2013/0035790 A1* | 2/2013 | Olivier, III ........... | G05D 1/0246 700/246 |
| 2014/0176663 A1* | 6/2014 | Cutler ................... | H04N 7/142 348/14.07 |
| 2015/0244807 A1* | 8/2015 | Shoemake ............ | H04L 67/125 709/202 |
| 2016/0122012 A1* | 5/2016 | Choo ................... | B64C 39/028 244/17.23 |

* cited by examiner

*Primary Examiner* — Quoc D Tran
(74) *Attorney, Agent, or Firm* — Anova Law Group, PLLC

(57) ABSTRACT

The present disclosure provides a method for a privacy-aware indoor drone exploration and communication framework, including: receiving a communication request for a target person from an outside caller; locating the target person in response to the communication request; establishing a video call between the target person and the outside caller to transmit images of the target person to the outside caller; and avoiding showing privacy areas and privacy objects in the indoor environment in the images of the target person to the outside caller during the video call.

19 Claims, 6 Drawing Sheets

PRIVACY-AWARE INDOOR DRONE EXPLORATION AND COMMUNICATION FRAMEWORK

FIELD OF THE INVENTION

The present invention generally relates to the computer technologies and, more particularly, relates to a privacy-aware indoor drone exploration and communication framework.

BACKGROUND

Drones can be configured to have advanced artificial intelligence and computer vision techniques for conducting various tasks that are difficult for humans and other robots. For example, drones can be used to create three-dimensional maps and move from one location to another with little or no obstacles in an indoor environment, such that a drone may be used to better monitor the indoor environment or do other things, e.g., reaching a person in a house.

In an example, a drone may be used to locate a person when the person cannot be reached by phone. The person may be away from the phone and the drone can receive the incoming call and fly in the house to locate the person so that the person can be reached and a communication path, e.g., a video call, may be established between the person and the caller.

However, when a video call is established, a conventional drone may show privacy information or sensitive information in the house to the caller. For example, a conventional drone may show certain personal belongings and certain areas that are not appropriate to be shown to certain other persons. As a result, security issues or security concerns may arise due to lack of protection over privacy information. Thus, privacy protection functions in conventional drones need to be improved.

The disclosed methods and systems are directed to solve least partial problems set forth above and other problems.

BRIEF SUMMARY OF THE DISCLOSURE

The present invention addresses the above problems in the prior art. The present disclosure provides a system and method used for a privacy-aware drone exploration and communication framework. The disclosed drone may avoid showing sensitive/privacy information in the operating environment, e.g., an indoor environment, during a video call between a person in the operating environment and an outside person. Thus, persons in the operating environment may be reached by the disclosed drone and privacy information may be better protected.

One aspect of the present disclosure provides a method for a privacy-aware indoor drone exploration and communication framework, including: receiving a communication request for a target person from an outside caller; locating the target person in response to the communication request; establishing a video call between the target person and the outside caller to transmit images of the target person to the outside caller; and avoiding showing privacy areas and privacy objects in the indoor environment in the images of the target person to the outside caller during the video call.

Another aspect of the present disclosure provides a system for a privacy-aware indoor drone exploration and communication framework, including: receiving a communication request for a target person from an outside caller; locating the target person in response to the communication request; establishing a video call between the target person and the outside caller to transmit images of the target person to the outside caller; and avoiding showing privacy areas and privacy objects in the indoor environment in the images of the target person to the outside caller during the video call.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

For those skilled in the art to better understand the technical solution of the invention, reference will now be made in detail to exemplary embodiments of the invention, which are illustrated in the accompanying drawings. Wherever possible, the same reference numbers will be used throughout the drawings to refer to the same or like parts.

A conventional drone may undesirably expose details of certain privacy information in the operating environment when facilitating communications between a person in the operating environment and an outside caller. Security issues or concerns over security may be resulted.

The present disclosure provides a system and a method for a privacy-aware indoor drone exploration and communication framework. The disclosed drone may be suitable for indoor operation or outdoor operation. For illustrative purposes, only indoor operation of the disclosed drone is described in the present disclosure, and a house is used as an example of the indoor environment. The disclosed drone may facilitate real-time communications between a person in the operating environment, i.e., indoor environment, and a person outside of the operating environment, i.e., an outside caller. In the present disclosure, the term "outside"

may be used to refer a person or an object outside of the indoor environment or the operating environment of the drone.

The disclosed method and system used for the framework provides a new solution for drone and human communication, taking human privacy into account. First, the present disclosure provides a solution for drone to find the target person. Further, the present disclosure provides means on how to protect user privacy when communicating with others by drone.

Figure 1:
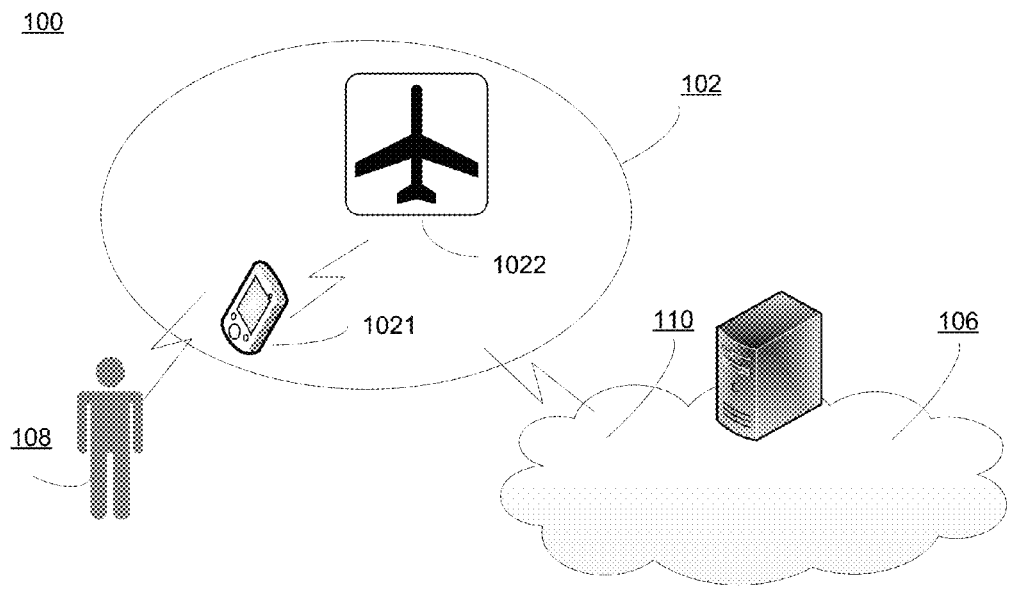
FIG. 1 illustrates an exemplary environment incorporating various disclosed embodiments of the present disclosure.
Figure 2:
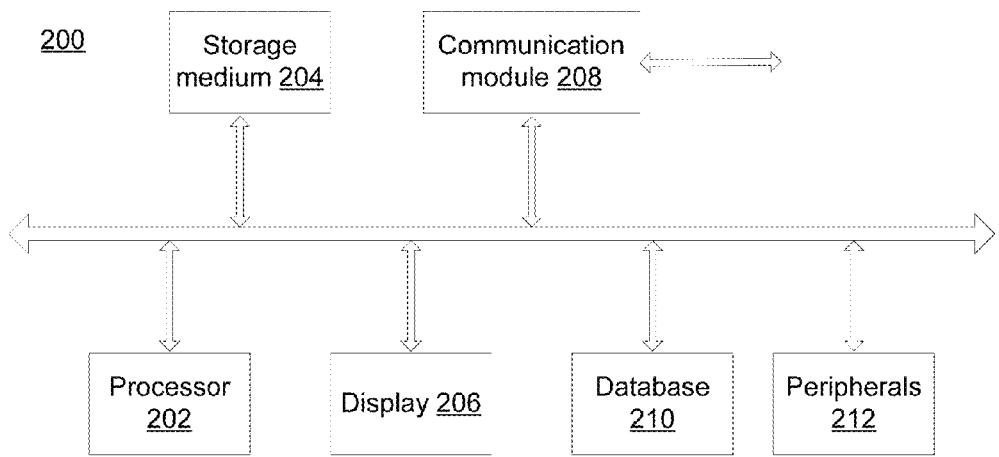
FIG. 2 illustrates a block diagram of an exemplary control unit used in various disclosed embodiments of the present disclosure.

FIG. 1 illustrates an exemplary operating environment incorporating the embodiments of the present disclosure. FIG. 2 illustrates a block diagram of an exemplary control unit used in embodiments of the present disclosure.

As shown in FIG. 1, environment 100 may include a terminal 102, a server 106, a user 108 and a network 110. Certain device(s) may be omitted and other devices may be added. A user 108 may operate terminal 102 for certain services provided by server 106. Although only one server 106 and one terminal 102 is shown in the environment 100, any number of terminals 102 or servers 106 may be included, and other devices may also be included.

Terminal 102 may refer to any appropriate user terminal with certain computing capabilities, such as a personal computer, a hand-held computing device (tablet), a smart phone or mobile phone, or any other user-side computing device. Terminal 102 may be implemented on any appropriate computing platform. Terminal 102 may be used by user 108 to connect to network 110 and make requests to server 106 via a webpage, an app or other interfaces. For example, user 108 may use terminal 108 to visit a website hosted by server 106 for sharing and trading activities, such as renting a room, selling a used item, etc. The terminal 102 may include, e.g., a remote controller 1021 and a drone 1022. Optionally, user 108 may control the drone 1022 through the remote controller 1021. The drone 1022 may also function without being controlled by the remote controller 1021.

Server 106 may refer to one or more server computers configured to provide certain server functionalities (e.g., hosting a website, conducting a search, processing data), such as data query and computation tasks. Server 106 may include one or more processors to execute computer programs in parallel. Server 106 may store data (e.g., item descriptions) to be accessed by terminals 102. For example, server 106 may host an app and/or a website to facilitate sharing and trading activities between users 108, such as providing an interface for a seller to post an item, an interface for a buyer to search and browse items, a mechanism for buyers and sellers to communicate, a mechanism to complete buying or selling transactions, etc.

Although server 106 is shown in a single computer configuration, more computers or server clusters can be included in server 106. Server 106 may provide cloud-based services in a cloud computing environment, i.e., the use of computing resources (hardware and software) that are delivered as a service over a network infrastructure (e.g., the Internet). The cloud computing environment may include any private cloud configuration and/or public cloud configuration. Various servers 106 (i.e., server services) in the cloud may be configured to provide data storage and computation functionalities (e.g., training and utilizing a time-value model).

Terminal 102 and server 106 may communicate with each other through communication network 110, such as the Internet or other types of computer networks or telecommunication networks, either wired or wireless, such as a cable network, a phone network, and/or a satellite network, etc.

Terminal 102 and/or server 106 may be implemented on any appropriate computing circuitry platform. Terminal 102 and/or server 106 may be implemented on any appropriate computing circuitry platform.

FIG. 2 shows a block diagram of an exemplary control unit 200, i.e., a computing system, capable of implementing terminal 102 and/or server 106.

The control unit 200 used in the embodiments of the present disclosure may be configured to control the operation and functions of different devices in the system. As shown in FIG. 2, control unit 200 may include a processor 202, a storage medium 204, a display 206, a communication module 208, a database 210 and peripherals 212. Certain devices may be omitted and other devices may be included.

Processor 202 may include any appropriate processor or processors. Further, processor 202 can include multiple cores for multi-thread or, parallel processing. Processor 202 may execute sequences of computer program instructions to perform various processes. Storage medium 204 may include memory modules, such as ROM, RAM, flash memory modules, and mass storages, such as CD-ROM and hard disk, etc.

Storage medium 204 may store computer programs for implementing various processes when the computer programs are executed by processor 202, such as computer programs for rendering graphics for a user interface, implementing a facial recognition process, etc. Storage medium 204 may store computer instructions that, when executed by the processor 202, cause the processor to generate images for multiple tasks. The computer instructions can be organized into modules to implement various calculations and functions as described into the present disclosure.

Further, communication module 208 may include certain network interface devices for establishing connections through communication networks. Database 210 may include one or more databases for storing certain data and for performing certain operations on the stored data, such as database searching. Further, the database 210 may store images, videos, personalized information about the user 108, such as preference settings, favorite programs, user profile, etc., and other appropriate contents.

Display 206 may provide information to a user or users of TV 102. Display 206 may include any appropriate type of computer display device or electronic device display such as CRT or LCD based devices. Display 206 may also implement display technologies for creating graphical display effects of input contents. Peripherals 212 may include various sensing devices and other I/O devices, such as body sensing device, motion sensing device, microphones, cameras, etc.

For example, an outside caller may call the cell phone of the user 108, The user 108 may be away from the cell phone and may not be able to pick up the phone in time. The drone 1022 may be wirelessly connected to the cell phone through the communication network 110 and the drone 1022 may be configured to receive the incoming call from the outside caller. When the user 108 does not pick up the ringing cell phone for a certain amount of time, the drone 1022 may detect the location of the user 108, and establish a connection or a video call between the user 108 and the outside caller after locating and approaching the user 108. To locate the user 108, the drone may access a three-dimensional map of the house and/or other related data, previously stored in the storage medium 204, and process the information in the processor 202. Following the map, the processor 202 may control the speed, depth, height, and/or moving distance of the drone, and perform person tracking and/or facial recognition of the persons in the house. The information related to the person tracking and facial recognition may be previously stored in the storage medium 204 and/or database 210. After the drone finds a match of user 108, the drone may display the video or voice from the outside caller to the user 108 through the display 206 and/or peripherals 212. During the flying and the communication, the control unit 200 may control the drone to automatically avoid showing sensitive/privacy information in the house.

Figure 3:
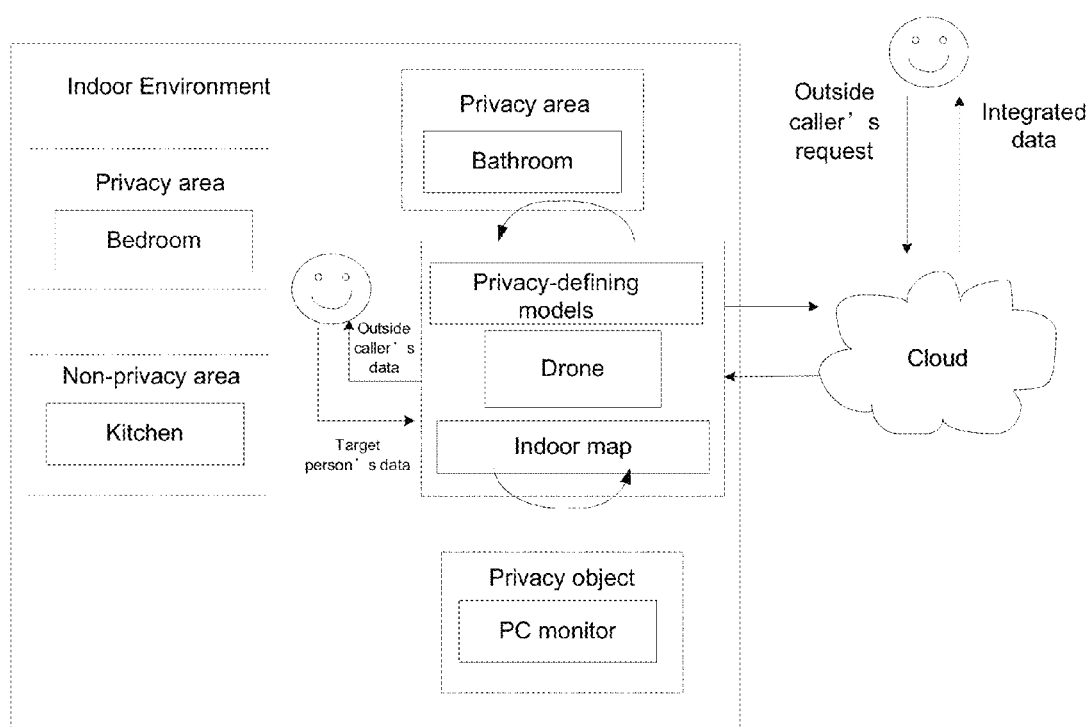
FIG. 3 illustrates an exemplary privacy-aware indoor drone exploration and communication framework consistent with various disclosed embodiments of the present disclosure.

FIG. 3 illustrates an exemplary framework for the operation of the disclosed frame work. Arrows shown in FIG. 3 indicate the direction of data flow. The drone may automatically fly and plan routes in the indoor environment based on a generated three-dimensional map. After finding the target person, the drone may establish a connection between the target person and the outside caller. With the ability to recognize the target person, and the predefined privacy area and privacy objects, the drone may protect privacy information before streaming video content to the outside caller.

As shown in FIG. 3, an indoor environment, e.g., a house, may be an operating environment of the disclosed drone. The house may include a bedroom, a bathroom, a kitchen, and a PC monitor. Other features/objects in the house may be omitted for illustrative purposes. The drone may be controlled to fly around the house and generate a three-dimensional map of the house. The user of the drone may configure the settings of the drone such that certain areas and/or certain objects detected by the drone may be labeled or categorized, automatically by the drone, as privacy areas and/or privacy objects. The privacy areas and the privacy objects may not be shown, by the drone, to an outside caller during a video call between a target person in the house and the outside caller. In the present disclosure, the privacy level of an area/object refers to whether the area/object is a privacy-area/privacy-object.

The user of the drone may control the drone to fly around the house and generate an indoor map, e.g., a three-dimensional map, of the house. The user may remotely control the drone to fly in and map the house, or turn on an automatic mapping function on the drone so that the drone may fly in the house and map the house automatically. The drone may generate an indoor map and store the indoor map for further navigation.

The indoor map may be a three-dimensional map that contains at least the floor plan of the house. In some other embodiments, the indoor map may be a three-dimensional map that further contains the positions, locations, arrangement, dimensions, and appearance of the objects in the house. In some other embodiments, the indoor map may be a three-dimensional map that further contains the positions, locations, arrangement, dimensions, and appearance of the objects in the house and the privacy level of an object and an area. The user may configure certain settings in the drone such that the drone may map the house, generate a three-dimensional map of the house, recognize the detected objects and areas in the house, and categorize the areas and/or objects as privacy areas/objects according to certain criteria, e.g., privacy-defining models, Accordingly, the indoor map may include a floor plan of the house, as shown in FIG. 3, with data (e.g., positions) of privacy areas and privacy objects stored in, the drone for further reference. For illustrative purposes, the privacy areas and privacy objects stored in the drone for reference may be in a privacy category.

The drone may be stored with privacy-defining models for determining the privacy areas and privacy objects. In various embodiments, the drone may have default privacy-defining models, and the user may also add or remove user-defined privacy defining models. The privacy-defining models are used to categorize areas and objects as privacy areas and privacy objects, which are further stored in the privacy category. The privacy areas and privacy objects may not be shown to an outside caller during a video call.

When an outside caller requests a video call, the drone search for the target person in the house in response to the outside caller's request. The drone may follow the indoor map to navigate in the house so as to avoid collisions. After the drone locates the target person, the drone may record images of the target person and the surroundings and send the images to the outside caller in real-time.

In some embodiments, the indoor map does not include privacy levels of areas and objects. During a video call, the drone may automatically detect the areas and objects near the target person and compare the detected areas and objects to privacy-defining models, to determine the privacy-levels of the detected areas and objects in real-time. The drone may mosaic the privacy areas and the privacy objects and send the mosaicked images to the outside caller in real-time, or change routes to avoid showing the privacy areas and privacy objects.

In some embodiments, the indoor map already includes the privacy levels of areas and objects, i.e., the privacy category. In this case, during a video call, the drone may compare the detected areas and objects to the privacy category to determine the privacy levels of the detected areas and objects in real-time. If the drone detects new areas and/or objects not in the previously stored indoor map, the drone may continue to compare the new areas and/or objects to privacy-defining models, and determine the privacy levels of the new areas and/or objects. If a new area and/or new object fits a privacy-defining model, the drone may mosaic the privacy areas and the privacy objects and send the mosaicked images to the outside caller in real-time, or change routes to avoid showing the privacy areas and privacy objects. The drone may also update the privacy category, e.g., by adding the newly determined privacy areas and privacy objects to the privacy category.

In various embodiments, the privacy-defining models may be any suitable models, e.g., scenes and/or product information, that can be used to categorize certain areas and objects as privacy areas and privacy objects. For example, privacy-defining models may include or be associated with scenes typically shown in bathrooms and bedrooms and scenes typically containing personal information. In some embodiments, a scene typically shown in bathrooms may include objects such as toilets, shower curtains, toothbrushes, and medicine bottles. Accordingly, an area containing the abovementioned scenes may be categorized as a privacy area by the drone. Scenes showing personal information may include pictures, photos, and computer monitors. An object containing the scene, showing person information, may be categorized as a privacy object. In certain embodiments, faces of other persons in the surroundings other than the target person, may also be sensitive and may be categorized as privacy objects.

Figure 7:
FIG. 7 illustrates an exemplary three-dimensional map generated by a drone consistent with various disclosed embodiments of the present disclosure.

The drone may be programmed to move from an area (e.g., a room) to another area, and determine the area of each room. The drone may use various sensors to measure the dimensions of each room, process the measurable quantities, and determine the dimensions of each room. The drone may also be configured to capture (e.g., record) the images of a room or an object, perform a scene recognition process to recognize the room and the object, and determine the privacy levels of the room and the object. The drone may be configured to determine the privacy level of an area and/or object during or after the mapping process. By combining the data of an area and the objects in the area, the drone may generate an indoor map of the house (i.e., as shown in FIG. 7), the location and position of each object and each room, and the privacy level of a room and an object (i.e., as shown in FIG. 3). To determine the privacy level of an area and/or object, the drone may obtain related data (e.g., record images and product information) of an area and/or object, and compare the related data with the privacy-defining models. The drone may store areas and objects that fit the privacy-defining models as privacy areas and privacy objects, respectively, into the privacy category. During a real-time video chat, when the drone detects an area or an object that is not previously stored in the privacy category and fits a privacy-defining model, the drone may avoid showing the area and object by mosaicking the area and the object in the images sent to the outside caller or changing routes to avoid recoding the area and the object. The privacy category may contain related data such as the location, position, property, product information, and appearance of a privacy object/privacy area. The user may also overwrite or update specific areas and/objects in the privacy category.

In one embodiment, the drone may be accessed from a computer through wireless network, and the user may define the privacy category and/or privacy-defining models on the computer and further synchronize the related settings on the drone. For instance, the drone may define the bedroom to be a privacy area, a PC monitor to be a privacy object, and the kitchen to be a non-privacy area, based on the privacy-defining models. The user may further define a table in the kitchen, having not fit to a privacy-defining model, to be a privacy object and add the table to the privacy category. The user may further edit privacy-defining models in the drone by adding or removing scenes typically shown in an area or an object. For example, the user may define the scene of a photo frame to be a privacy-defining model. In an embodiment, during a video call, the drone may record images of the target person and the surroundings, and may compare the recorded areas and objects to the indoor map in real-time. Based on the comparison, the drone may mosaic objects and areas that are categorized as privacy areas and privacy objects or change routes to avoid showing, these objects and areas in a real-time video call. Privacy areas and privacy objects in the privacy category may not be shown to an outside caller, and the non-privacy areas may be shown to an outside caller. In another embodiment, the drone may include certain buttons and/or a touch screen so that the user may directly edit the settings and parameters, such as editing the privacy areas and privacy objects, on the drone.

Specifically, in some embodiments, during a video call, the drone may record videos or take pictures of each room, and compare the detected objects and areas in the images to the pre-stored indoor map to determine the privacy levels of the objects and the areas in real-time. The drone may compare the location, position, appearance, and dimension of the detected area/object to the locations, positions, appearance, and dimensions stored in the privacy category of the drone, to determine the detected areas/objects are privacy areas/objects. If the detected areas and/or detected objects match the pre-stored indoor map, the drone may avoid showing the detected areas and/or detected objects, by, e.g., changing routes or mosaicking the detected areas and/or detected objects. If the drone detects areas or objects that have no match to the pre-stored indoor map, the drone may compare the detected area or the detected object to different types of privacy-defining models and determine if an area or an object fits a privacy-defining model. If a match can be formed between a detected area/object and a privacy-defining model, the drone may determine the area to be a privacy area and/or the object to be a privacy object, and add the privacy area and/or the privacy object to the privacy category. Meanwhile, the drone may mosaic the privacy area and/or the privacy object in the images sent to the outside caller in real-time, or change routes to avoid showing the privacy area and/or the privacy object in the images sent to the outside caller.

The drone may be connected to a wireless network and/or the cell phone such that an incoming call or other transmitted data may be received by the drone. Also, the drone may establish wireless communication between a person in the house and an outside person. In an example, an outside caller may call a target person in the house, on the cell phone. The outside caller's request may be sent to the cloud and further sent to the drone from the cloud. The drone may receive the outside caller's request and may start performing person tracking and facial recognition to determine the target person. After locating the target person, the drone may establish a wireless communication between the target person and the outside caller. Target person's data, i.e., video and/or audio data from the target person, may be transmitted to the cloud through the drone. The target person's data may be further transmitted to the outside caller in the form of integrated data. The outside caller's data, i.e., video and/or audio data from the outside caller, may also be transmitted to the target person through the cloud and further through the drone. Thus, two-way communication, as shown in FIG. 3, may be formed between the target person and the outside caller.

When the target person is moving during the video call, the drone may adjust the position and angle so that the drone may stay in a desired distance range for the target person to be seen and heard properly. Meanwhile, information of the outside caller may be displayed, properly. Quality of the video call may be ensured. The position and moving speed of the drone may be set by the user or may be automatically adjusted by the drone through suitable computer programs. During the movement, the drone may continue to record the target person, and may record other areas and objects in the surroundings. The drone may continue to update the drone's location in the indoor map and compare the newly recorded areas and objects to the privacy areas/objects in the privacy category. The drone may avoid showing the areas that are categorized to be privacy areas and the objects that are categorized to be privacy objects in the images sent the target person, to the outside caller in the real-time video call.

Specifically, in certain embodiments, when the indoor map is not sufficiently updated, the drone may record some areas and/or objects that are not in the previously-stored indoor map or in the privacy category. In this case, the drone may record the areas and/or objects, and compare the recorded images to the privacy-defining models in real-time. In real-time, the drone may determine if the newly recorded areas and/or objects are privacy areas and/or privacy objects, and mosaic the privacy areas and the privacy objects. The drone may send the images of the target person, with the privacy areas and privacy objects mosaicked, to the outside caller in real-time. The drone may further update the privacy category by, e.g., adding the newly determined privacy objects and privacy areas into the privacy category or removing the newly determined non-privacy objects and privacy areas from the privacy category.

In another example, as shown in FIG. 3, the drone may categorize the bedroom and the bathroom and privacy areas, the kitchen as a non-privacy area, and the PC monitor as a privacy object. During a video call, the target person may move from the bedroom to the kitchen, and the drone may follow the user from the bedroom to the kitchen. The drone may update the location of the drone in the indoor map in real-time, and compare the recorded images to the pre-stored indoor map and the privacy category such that the drone may recognize the privacy areas, the non-privacy area, and the privacy object in the recorded image in real-time. The drone may mosaic the privacy areas and privacy objects in real-time. In the images sent to the outside caller, the drone may automatically mosaic surroundings in the bedroom and show surroundings in the kitchen. The drone may also adjust the position to avoid recording the bedroom in the video call. When the drone detects the kitchen contains certain objects that match privacy-defining models, the drone may mosaic the certain objects in the images sent to the outside caller, in real-time.

In some embodiments, the drone may immediately start locating the target person when receiving the outside caller's request. In some other embodiments, the drone may start locating the target person after receiving the outside caller's request for a certain amount of time. That is, the drone may be programmed to wait until the target person has time to pick up the cell phone first. If the cell phone rings for a certain amount of time and is not being picked up, the drone may start locating the target person. The cell phone number of the target person and the facial characteristics of the target person may both be stored in the drone and may be linked to each other. That is, when the drone receives an incoming call for the target person's cell phone number, the drone may start locating the face features, i.e., the target person's face, linked to the cell phone number. In various embodiments of the present disclosure, the drone may be stored with the cell phone numbers of different persons in the house and the facial features of the persons, so that the d rove may locate different person when there are incoming calls for different persons.

In certain embodiment, the drone may receive a second outside caller's call for a second target person during a video/audio call with a first target person. The drone may display a notification message of the incoming call so that the first target person may be able to select among different options. The options may include but may not be limited to, "ignore the incoming call", "end the present call and locate the second caller", and "pick up the incoming call". The above mentioned options are merely exemplary and the specific languages of the options may vary.

Figure 4:
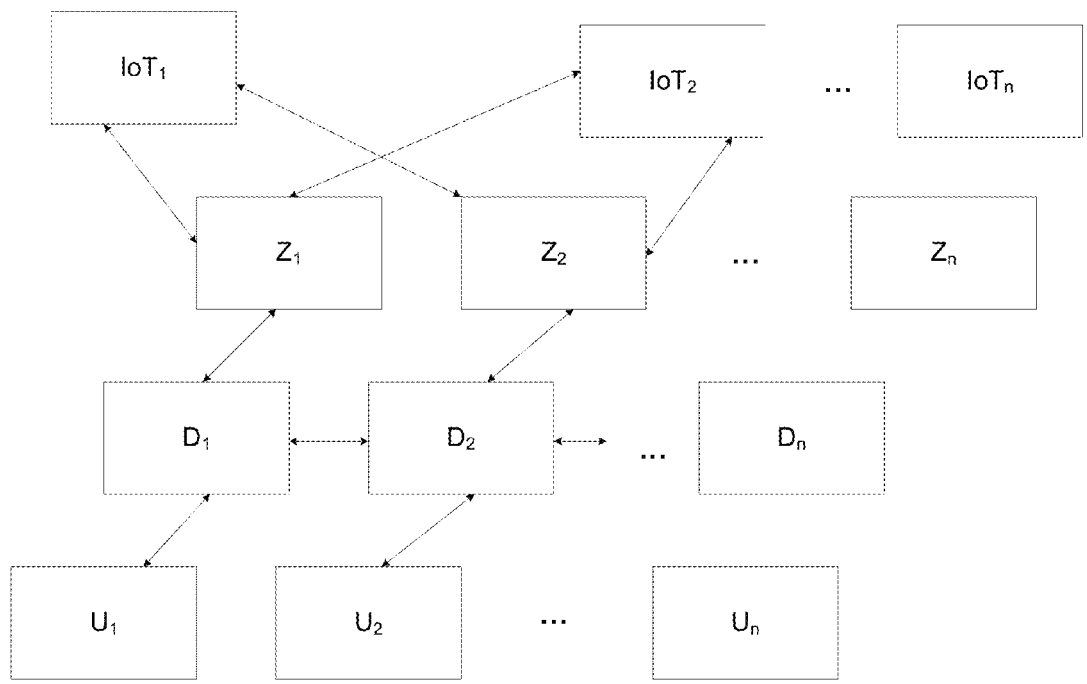
FIG. 4 illustrates an exemplary data flow chart consistent with various disclosed embodiments of the present disclosure.

FIG. 4 illustrates an exemplary data flow among different elements for creating an indoor map.

As shown in FIG. 4, a plurality of internet of things (e.g., $IoT_1$-$IoT_n$), a plurality of drone observations (e.g., $Z_1$-$Z_n$), a plurality of drone positions ($D_1$-$D_n$), and a plurality of drone actions ($U_1$-$U_n$), may be used to generate an indoor map. A double ended arrow may represent data flows between the two elements connected by the double ended arrow. IoTs may represent any suitable devices, in the house, that can communicate with the drone through wireless network, to send data reflecting the position information and product information of the IoTs to the drone. Drone observations may include the parameters and/or quantities of the indoor map, determined by the drone. In one embodiment, the drone observations may include the dimensions of areas. Drone positions may include parameters and/or quantities reflecting the locations of the drone. Drone actions may include commands, parameters, and/or quantities reflecting the movement of the drone. FIG. 4 is only exemplary, and the number of IoTs, drone observations, drone positions, and drone actions should not be limited by the embodiments of the present disclosure. For illustrative purposes, the working principles of FIG. 4 is described using $IoT_1$, $IoT_2$, $Z_1$, $Z_2$, $D_1$, $D_2$, $U_1$, and $U_2$. In practice, the number of drone observations and other related elements for determining the drone observations may be subjected to different applications and/or designs.

The drone observations, $Z_1$-$Z_2$, may be determined based on the locations and positions of $IoT_1$ and $IoT_2$, and drone positions $D_1$ and $D_2$. Specifically, a drone observation, $Z_1$ or $Z_2$, may be determined based on the coordinates of $IoT_1$ and $IoT_2$, and a corresponding drone position, i.e., $D_1$ for $Z_1$ and $D_2$ for $Z_2$. For example, as shown in FIG. 4, $IoT_n$ may represent data associated with the coordinates of an IoT and/or product information of the IoT, $Z_n$ may represent the parameters of a drone observation, $D_n$ may represent the parameters of a drone position, and $U_n$ may represent commands and/or parameters of a drone action. Drone positions $D_1$-$D_n$ may be correlated, as shown in FIG. 4, so that the parameters of one drone position may be used to determine the parameters of another drone position.

In an embodiment, $IoT_1$ and $IoT_2$ may represent the coordinates and the product information of $IoT_1$ and $IoT_2$, respectively. $Z_1$ may represent an area of a room, and $Z_1$ may represent a height of the room. $D_1$ may represent the horizontal coordinates of the drone, and $D_2$ may represent the vertical coordinate of the drone. $U_1$ may represent moving forward and backward, and $U_2$ may represent moving up and down. The drone may determine the area of the room based on the coordinates of $IoT_1$ and $IoT_2$, and $D_1$, the horizontal coordinates of the drone. The drone may determine the height of the room based on the coordinates of $IoT_1$ and $IoT_2$, and $D_2$, the vertical coordinates of the drone.

The drone may execute the command of $U_1$, moving forward and backward, and update $D_1$, the horizontal coordinates of the drone, accordingly. The drone may also execute the command of $U_2$, moving up and down, and update $D_2$, the vertical coordinates of the drone, accordingly. The drone may apply $D_1$, the horizontal coordinates of the drone, to determine or adjust the $D_2$, the vertical coordinate of the drone. The drone may further determine the area of the room based on the coordinates of $IoT_1$ and $IoT_2$, and $D_1$, the horizontal coordinates of the drone; and may determine the height of the room based on the coordinates of $IoT_1$ and $IoT_2$, and $D_2$, the vertical coordinates of the drone. Thus, the area and the height of the room may be determined and stored in the indoor map.

The drone actions $U_1$ and $U_2$ may be performed at the same time or at different times. If the drone actions $U_1$ and $U_2$ are performed at the same time, the drone position resulted from the drone action performed earlier may be used to adjust the drone position resulted from the drone action performed later.

The drone may continue to make movements and determine the dimensions of different areas, e.g., different rooms. The IoTs at different locations may have sufficiently stable locations/coordinates, and may be used as landmarks, for determining the dimensions of different areas in the house. The IoTs may also communicate with the drone and share certain product information of the IoTs so that the drone may better map the house and using the IoTs, having different product information, as landmarks. Because the drone may also apply the drone positions during the movement for calculating the drone observations, the drone may also generate a route of the drone, and relative positions of each area along the route. When the drone completes mapping the house, the drone may generate the indoor map with floor plan of the house. The drone may also be configured to generate a map for only a desired portion of the house.

The drone may automatically adjust drone actions based on feedback signals or data of the drone observations $Z_1$ and $Z_2$. For example, the drone may apply $Z_1$, the area of the room, and $Z_2$, the height of the room together with the drone positions $D_1$ and $D_2$, to determine if the drone is moving towards an undesirable direction or an undesirable object, e.g., a wall or a TV screen. The drone positions $D_1$ and $D_2$, representing the horizontal coordinates and the vertical coordinate of the drone, respectively, may be used to adjust or change the drone actions $U_1$ and $U_2$. For example, the drone may be moving forward ($U_1$) and moving up ($U_2$). Based on $Z_1$ (the area of a room), $Z_2$ (the height of the room), the ($D_1$) horizontal coordinates of the drone, and ($D_2$) the vertical coordinate of the drone, the drone may determine the drone is approaching a wall and the ceiling. Thus, the drone may start to move backward and move down to avoid collision.

As shown in FIG. 4, data may be transmitted in both ways between an IoT and a drone observation, between a drone observation and a corresponding drone position, between two drone positions, and between a drone action and a corresponding drone position. That is, the drone may communicate with different IoTs for location information and product information. The drone may also be configured to execute a desired action, and the action may result change in a corresponding drone position. The drone may further automatically adjust the drone action based on the corresponding drone position. The drone may determine a drone observation based on a corresponding drone position and coordinates of IoTs. The drone may also adjust a drone position, as a result of an adjustment of a drone action, based on a corresponding drone observation. A drone position may be used to adjust another drone position reached by the drone at the same time or a later time. Details to the data transmission may be referred to previous description and are not repeated herein.

In some embodiments, the drone may use various objects as landmarks for generating a three-dimensional indoor map. The landmarks may include but may not be limited to the IoTs, furniture, appliances, etc. The drone may detect the positions and arrangement of the landmarks, and generate a three-dimensional map that includes the floor plan and the arrangement of the furniture, appliances, and other objects in the house.

The user may control the drone to fly and map the house, so as to generate the indoor map. The drone may automatically start moving after receiving a command to map the house. The user may also control the drone to fly in a desired area of the house such that the drone may generate a map of the area. The control of the drone may be through the remote controller 1021 of the drone, or certain control functions on the drone.

The drone may be configured to include a plurality of sensors for sensing the distance, depth, appearance, and other measurable quantities for calculating the dimensions of each room, the arrangement, and the features of each room. The quantities measured by the drone, and the images captured by the drone may be combined to generate the three-dimensional indoor map of the house. The sensors may include and not limited to ultrasonic rangers, cameras, depth sensors, RGB (red, green, blue) cameras, and infrared cameras.

In some embodiments, simultaneous localization and mapping (SLAM) may be used for mapping the house and generating the indoor map. In other various embodiments, other suitable methods may also be used to generate the indoor map.

FIG. 7 illustrates an exemplary indoor map generated by the drone after mapping the house.

By applying the process illustrated in FIG. 4, dimensions of the house may be obtained and the objects and arrangement in each room may be recorded. The drone may perform a scene recognition process to recognize certain objects and/or features in each room to determine the privacy level of the room. For example, scenes typically shown in bathrooms and bedrooms and scenes typically containing personal information may be used in the privacy-defining models to categorize the privacy level or a room. In some embodiments, a scene typically shown in bathrooms may include objects such as toilets, shower curtains, toothbrushes, and medicine bottles. Accordingly, an area containing the abovementioned scene may be categorized as a privacy area by the drone. Scenes showing personal information may include pictures, photos, and computer monitors, An object containing the scene, showing person information, may be categorized as a privacy object. In certain embodiments, faces of other persons in the surrounding other than the target person, may also be sensitive and may be categorized as privacy objects.

The drone may perform any suitable algorithm for scene recognition. For example, convolutional neural networks (CNNs) may be used for scene recognition and determine if a recognized scene fits a privacy-defining model. If a scene fits a privacy-defining model, the drone may determine the room to be a privacy area. The drone may mosaic the room during a video call in or near the room, or change routes during a video call to avoid showing the room. If a scene does not fit a privacy-defining model, and certain objects in the scene fits a privacy-defining model, the drone may mosaic the objects during a video call near the objects, or change routes/positions to avoid showing the objects.

The scene recognition process may be performed in-real time or after the data of the entire house has been collected. For example, the drone may perform the scene recognition process during the process of mapping the house, or after mapping the entire house. In some embodiments, the drone may automatically perform scene recognition during a video call so that scenes not recorded in the indoor map that is being used may be recognized and protected in real-time. For example, during a video call, if the arrangement of a non-privacy room is changed and not updated in the indoor room, or if persons are moving near the drone, the drone may automatically perform scene recognition to protect privacy areas and privacy objects.

Figure 5:
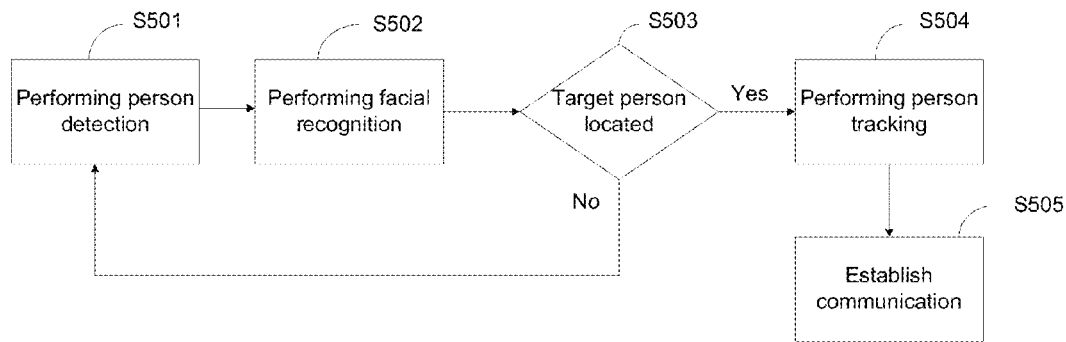
FIG. 5 illustrates an exemplary process of person detection and recognition using a drone consistent with various disclosed embodiments of the present disclosure.

FIG. 5 illustrates an exemplary process of person detection and recognition.

In step S501, the drone may perform person detection. When the drone receives an incoming call from an outside caller, to the number of a target person, the drone may perform person detection in the house to determine the number and locations of the persons. The drone may use any suitable sensors, e.g., a generic person detector, to determine the location of each person sensed by the sensor. The drone may be stored with the facial feature of the target person, and the facial feature of the target person may be linked to the phone number of the target person.

In step S502, the drone may perform facial recognition. The drone may capture the facial features, e.g., by camera or an infrared detector, of the detected persons, and determine if the facial feature of a person fits the facial feature of the target person.

In step S503, the drone may determine if the target person is located. If the target person is located, the process may proceed to step S504. If the target person is not located, the process may proceed to step S501. The drone may compare the facial features of the detected persons of the facial feature of the target person, stored in the drone, to determine if the facial feature of a detected person fits the facial feature of the target person.

In step S504, the drone may perform person tracking. If the target person is located, the drone may perform person tracking to approach the target person. In some embodiments, the drone may fly to the target person direct. For example, when the target person is in a sufficiently short distance. In some other embodiments, the drone may fly to the target person using the indoor map. For example, when the target person is sufficiently far from the drone. The user may configure the distance that the drone is required to use the indoor map to approach a target.

In step S505, the drone may establish communication between the outside caller and the target person. After the drone approaches the target person, the drone may automatically establish the communication path between the target person and the outside caller, or may provide the target person an option to confirm the communication path between the target person and the outside caller.

In some embodiments, the drone may not be able to capture the facial feature of the target person after performing steps S501-S503 when the target person is in the house. For example, the target person may be in a different room than the drone and/or the target person is not facing the drone at a suitable angle. In this case, the drone may be configured to repeat performing steps S501-S503 for a certain amount of times, and may start flying in the house to perform step S501. The drone may follow the indoor map when the drone is flying.

Figure 8:
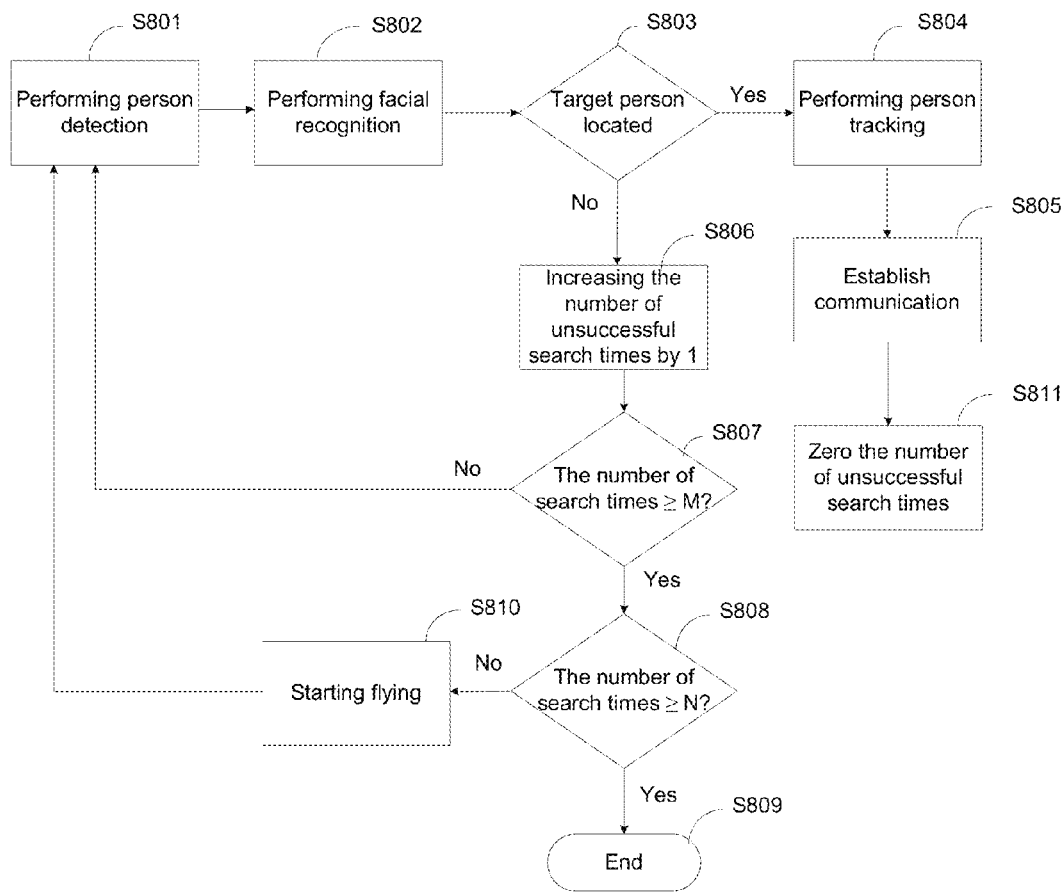
FIG. 8 illustrates another exemplary process of person detection and recognition using a drone consistent with various disclosed embodiments of the present disclosure.

Specifically, as shown in FIG. 8, steps S801-S805 may be the similar to steps S501-S505. Steps S806-S810 may be described as follows.

In step S806, the drone may increase the number of unsuccessful search times by 1. When the drone is not able to locate the target person, the drone may increase the number of unsuccessful search times by 1. That is, the drone may count the number of times that the drone unsuccessfully searches for the target person.

In step S807, the drone may determine if the number of search times is equal to or greater than M. If the number of search times is equal to or greater than M, the drone may proceed to step S808. If the number of search times is smaller than M, the drone may proceed to step S801. M may represent a number stored in the drone. M may be a positive integer, having a default value or set by the user.

In step S808, the drone may determine if the number of search times is equal to or greater than N. If the number of search times is equal to or greater than N, the drone may proceed to step S809. If the number of search times is smaller than N, the drone may proceed to step S810. N may represent a number stored in the drone. N may be a positive integer greater than M, having a default value or set by the user. The user may determine the values of M and N in the drone to ensure the target person may be effectively located in a shortest time.

In step S809, the process may end.

In step S810, the drone may start flying. The drone may start flying following the indoor map.

In step S811, the drone may zero the number of unsuccessful search times. In various embodiments, step S811 may be performed in any step after step S803. For example, step S811 may be performed between step S803 and step S804 or between step S804 and step S805.

That is, when the drone is not able to locate the target person, the drone may start to count the number of unsuccessful search times. The drone may keep searching for the target person without flying in the house, keep performing steps S801-S803, until the number of unsuccessful search times reaches M. When the number of unsuccessful search times is greater than M and smaller than N (M<N), the drone may start flying in the house and search for the target person. When the number of unsuccessful search times is greater than N, the drone may stop searching for the target person. When the drone successfully locates the target person, the drone may zero the number of unsuccessful search times.

It should be noted that, when the drone receives an incoming call and starts performing person detection (S501 and S801), the drone may be programmed to perform person detection at a suitable position. For example, the user may be able to program the drone to rise to a certain height and/or turn to a certain angle and start performing person detection. By adjusting the position of the drone, the drone may more effectively and accurately detect the persons in the house and recognize the persons' facial features.

Figure 6:
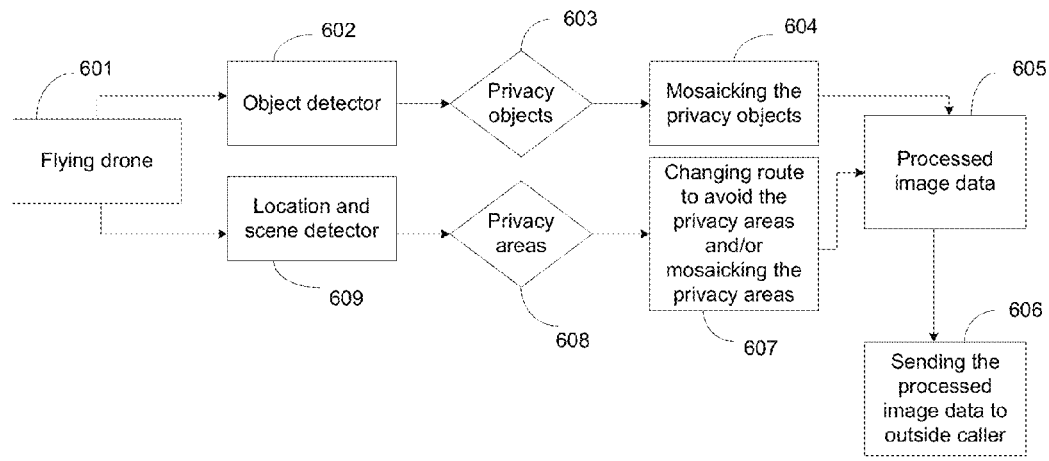
FIG. 6 illustrates an exemplary privacy data processing using a drone consistent with various disclosed embodiments of the present disclosure.

FIG. 6 illustrates an exemplary process of privacy data processing in the disclosed drone.

When the drone locates the target, person, the drone may approach the target person and establish the requested communication path, e.g., video call, between the target person and the outside caller. During the video call, the drone or the flying drone 601 may be in a desirably short distance from the target person. The flying drone 601 may use an object detector 602 to detect privacy objects 603, and may use a location and scene detector to detect privacy areas 608, during the video call. The flying drone 601 may follow the indoor map when flying and perform real-time scene recognition to determine the privacy objects 603 and privacy areas 608 in the house. The flying drone 601 may in real-time mosaic the privacy objects 604 in the images sent to the outside caller. The flying drone 601 may also in real-time mosaic privacy areas in the images sent to the outside caller, and/or change route to avoid the privacy areas 607. The flying drone 601 may collect the image data of the privacy objects 603 and privacy areas 608, together with the non-privacy objects and non-privacy areas, collected by the flying drone 601, and process the image data. Further, the flying drone may obtain processed image data 608, containing the privacy objects/areas mosaicked or avoided, and send the processed image data to the outside caller in real-time.

The object detector 602 and the location and scene detector 609 may be any suitable combination of hardware and software capable of sensing the privacy level of objects/areas. The software may include and may not be limited to programs for implementing CNNs and SLAM. The hardware may include and may not be limited to sensors such as cameras, infrared detectors, and depth sensor. The flying drone 601 may compare the detected objects and areas to privacy-defining models and categorize the objects and areas that fit privacy-defining models as privacy objects and privacy areas. The process to determine privacy objects and privacy areas may be referred to previous description and is not repeated herein.

In the present disclosure, the indoor map generated by the disclosed drone may be configured, by the user, to include or not include privacy objects and privacy areas. The user may also configure the indoor map to perform or not perform real-time detection during a video call. For example, the user may program the drone such that the indoor map, generated by the drone, already includes privacy objects and privacy areas, and the drone does not perform real time detection of privacy objects and privacy areas during a video call. Accordingly, the drone may follow the indoor map during the video call and avoid showing the privacy objects and privacy areas stored in the indoor map.

In another example, the user may program the drone such that the indoor map, generated by the drone, does not include privacy objects and privacy areas, and the drone perform real-time detection of privacy objects and privacy areas during a video call. In this case, the drone may follow the indoor map during the video call and avoid showing the determined privacy objects and privacy areas in real-time.

In another example, the user may program the drone such that the indoor map, generated by the drone, includes privacy objects and privacy areas, and the drone performs real-time detection of privacy objects and privacy areas during a video call. In this case, the drone may follow the indoor map during the video call, update the privacy areas and privacy objects stored in the indoor map, and avoid showing the privacy objects and privacy areas in real-time.

The disclosed privacy-aware drone may be used in various applications when privacy needs to be protected during a video call or any face-to-face communication methods. For example, the drone may be used to show the surroundings of an environment to a remote user, or for someone with disability. In another example, the privacy-aware function of the drone may also be turned off or disabled such that the drone may not avoid showing privacy areas and privacy objects during a video call.

In another example, the drone may also be used to send off-line images with the privacy-areas and privacy-objects mosaicked in the images. In this case, the drone may be configured to fly in the house and record images, following the indoor map. The drone may determine the privacy level of the recorded areas and objects during the recording or after the recording, and send images to a desired user with the privacy areas and privacy objects mosaicked. The drone may also recognize the privacy areas and privacy objects during the recording and change routes to avoid showing the privacy areas and privacy objects. Thus, the images sent to the designated user may not include privacy areas and privacy objects.

It should be understood that the above embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

What is claimed is:

1. A method for a privacy-aware indoor drone exploration and communication framework, comprising:
    receiving a communication request for a target person from an outside caller;
    locating the target person in response to the communication request;
    establishing a video call between the target person and the outside caller to transmit images of the target person to the outside caller; and
    avoiding showing privacy areas and privacy objects in the indoor environment in the images of the target person to the outside caller during the video call by performing one of mosaicking the privacy areas and the privacy objects in the images sent to the outside caller and changing routes to avoid recording the privacy areas and the privacy objects in the images sent to the outside caller.

2. The method according to claim 1, further comprising generating an indoor map before the video call for the privacy-aware drone to navigate and locate the target person, the indoor map containing a floor plan of the indoor environment.

3. The method according to claim 2, wherein the privacy-aware drone follows the indoor map to fly in the indoor environment during the video call and avoid showing privacy areas and privacy objects in the indoor environment in the images of the target person to the outside caller during the video call.

4. The method according to claim 3, wherein the privacy-aware drone recognizes the privacy areas and privacy objects in the indoor environment during the video call by comparing detected areas and detected objects to privacy-defining models, such that detected areas that fit privacy-defining models are privacy areas and detected objects that fit privacy-defining models are privacy objects.

5. The method according to claim 4, wherein the privacy-defining models includes scenes having private information; and the privacy-aware drone applies a scene recognition process to fit the detected areas and detected objects to the privacy-defining models.

6. The method according to claim 3, wherein the indoor map further includes pre-stored data of the privacy areas and privacy objects such that:
    the privacy-aware drone recognizes the privacy areas and privacy objects in the indoor environment during the video call by comparing detected areas and detected objects to the pre-stored data of the privacy areas and privacy objects so that detected areas that fit the pre-stored data of the privacy areas and privacy objects are privacy areas and detected objects that fit the pre-stored data of the privacy areas and privacy objects are privacy objects.

7. The method according to claim 6, wherein if the detected areas and the detected object are not contained in the indoor map, the privacy-aware drone compares the detected areas and the detected objects to privacy-defining models during the video call such that detected areas that fit privacy-defining models are privacy areas and detected objects that fit privacy-defining models are privacy objects; and the privacy-aware drone updates the pre-stored data of the privacy areas and privacy objects by adding the detected areas and the detected objects thereto.

8. The method according to claim 7, wherein the privacy-defining models includes scenes having private information; and the privacy-aware drone applies a scene recognition process to fit the detected areas and detected objects to the privacy-defining models.

9. The method according to claim 1, wherein the privacy-aware drone locates the target person by performing a person detection process to obtain a location of the target person, a facial recognition process to recognize a facial feature of the target person, and a person tracking process to approach the target person.

10. The method according to claim 9, wherein the facial feature of the target person is linked with the communication request from the outside caller and stored in the drone.

11. The method according to claim 1, wherein the privacy-aware drone contains at least one of an ultrasonic ranger, a camera, a depth sensor, a RGB (red, green, blue) camera, and an infrared camera.

12. The method according to claim 2, wherein the indoor map is generated based on using internet of things (IoTs) in the indoor environment as landmarks, positions of the privacy-aware drone, and actions of the privacy-aware drone.

13. A system for a privacy-aware indoor drone exploration and communication framework, comprising:
receiving a communication request for a target person from an outside caller;
locating the target person in response to the communication request;
establishing a video call between the target person and the outside caller to transmit images of the target person to the outside caller; and
avoiding showing privacy areas and privacy objects in the indoor environment in the images of the target person to the outside caller during the video call by performing one of mosaicking the privacy areas and the privacy objects in the images sent to the outside caller and changing routes to avoid recording the privacy areas and the privacy objects in the images sent to the outside caller.

14. The system according to claim 13, further comprising generating an indoor map before the video call for the privacy-aware drone to navigate and locate the target person, the indoor map containing a floor plan of the indoor environment.

15. The system according to claim 14, wherein the privacy-aware drone follows the indoor map to fly in the indoor environment during the video call and avoid showing privacy areas and privacy objects in the indoor environment in the images of the target person to the outside caller during the video call.

16. The system according to claim 15, wherein the privacy-aware drone recognizes the privacy areas and privacy objects in the indoor environment during the video call by comparing detected areas and detected objects to privacy-defining models, such that detected areas that fit privacy-defining models are privacy areas and detected objects that fit privacy-defining models are privacy objects.

17. The system according to claim 16, wherein the privacy-defining models includes scenes having private information; and the privacy-aware drone applies a scene recognition process to fit the detected areas and detected objects to the privacy-defining models.

18. The system according to claim 15, wherein the indoor map further includes pre-stored data of the privacy areas and privacy objects such that:
the privacy-aware drone recognizes the privacy areas and privacy objects in the indoor environment during the video call by comparing detected areas and detected objects to the pre-stored data of the privacy areas and privacy objects so that detected areas that fit the pre-stored data of the privacy areas and privacy objects are privacy areas and detected objects that fit the pre-stored data of the privacy areas and privacy objects are privacy objects.

19. The system according to claim 18, wherein if the detected areas and the detected object are not contained in the indoor map, the privacy-aware drone compares the detected areas and the detected objects to privacy-defining models during the video call such that detected areas that fit privacy-defining models are privacy areas and detected objects that fit privacy-defining models are privacy objects; and the privacy-aware drone updates the pre-stored data of the privacy areas and privacy objects by adding the detected areas and the detected objects thereto.

* * * * *